US006548011B1

(12) United States Patent
Rhee et al.

(10) Patent No.: US 6,548,011 B1
(45) Date of Patent: Apr. 15, 2003

(54) METHOD FOR MANUFACTURING SURFACE-MODIFIED ALUMINA-BASED CERAMICS

(75) Inventors: Young Woo Rhee, Taejeon (KR); Ho Yong Lee, Seoul (KR); Suk Joong Kang, Taejeon (KR)

(73) Assignee: Korea Advanced Institute of Science and Technology, Taejeon (KR)

( * ) Notice: Subject to any disclaimer, the term of this patent is extended or adjusted under 35 U.S.C. 154(b) by 99 days.

(21) Appl. No.: 09/687,879

(22) Filed: Oct. 12, 2000

(51) Int. Cl.[7] ................................................ C04B 33/32
(52) U.S. Cl. ........................ 264/662; 264/674; 501/127
(58) Field of Search ................................ 264/662, 674; 501/127

(56) References Cited

U.S. PATENT DOCUMENTS 4,895,814 A * 1/1990 Kanzaki et al. ............ 501/128
4,960,441 A * 10/1990 Pellow et al. ................ 51/293

* cited by examiner

*Primary Examiner*—Christopher A. Fiorilla
(74) *Attorney, Agent, or Firm*—Martine & Penilla, LLP

(57) ABSTRACT

A method of manufacturing an alumina-based ceramic includes sintering a powder compact of an iron-containing alumina powder in an atmosphere ($N_2$, 95 $N_2$-5 $H_2$, $H_2$) of a relatively low oxygen partial pressure, and annealing in an atmosphere (80 $N_2$-20 $O_2$, $O_2$) higher in oxygen partial pressure than the sintering atmosphere to provide an alumina-based ceramic with a grain-boundary migration layer on a surface thereof. The resulting undulated grain boundaries on the surface layer suppress and deflect the crack propagation, thereby improving the short-crack toughness. The formation of a grain-boundary migration layer on the surface of an alumina-based ceramic brings about a great improvement in short-crack related properties, including durability and wear resistance.

3 Claims, 10 Drawing Sheets

20μm

METHOD FOR MANUFACTURING SURFACE-MODIFIED ALUMINA-BASED CERAMICS

BACKGROUND OF THE INVENTION

1. Field of the Invention

The present invention relates to alumina-based ceramics whose surface is modified into a high toughness layer and to a method for manufacturing the same.

2. Description of the Prior Art

Alumina-based ceramics are widely used as ceramic components in modern electronic and machine industries, for example IC boards, bearings, cutting tool, etc. Like other ceramic materials, alumina-based ceramics are greatly limited in their applications by their susceptibility to brittle fracture. When flaws are present on the surfaces, their strength degrades considerably. Then, brittle fracture may catastrophically occur from the flaws, bringing about the poor reliability of the components. This is a great obstacle to expand their practical applications.

For decades, a number of studies have been conducted in order to control the microstructure for strengthening alumina-based ceramics. As exemplified by reduction of grain sizes to decrease the dimension of the flaws, by addition of a second phase, by quenching and by substitution of $Al_2O_3$ with $Cr_2O_3$ at the surface to induce compressive stresses, these strengthening methods were generally associated with an improvement in the strength of the material (E. Dörre and H. Hübner, Alumina: Processing, Properties, and Applications; pp. 74–192, Springner-Verlag Berlin, Heidelberg, 1984, 1). In order to prevent the catastrophic fracture attributable to the inherent high brittleness of ceramics and the decrease in reliability resulting from it, however, not only high strength, but also high toughness is required. In other words, a high flaw tolerance is required in order that the ceramics do not undergo a strength decrease even if flaws exist on the surface.

When the toughening of monolithic ceramics are related to the bridging and pull-out of grains, possible ways for improving its toughness are an increase in the number of bridging grains and an enlargement of the wake zone. In this regard, there is a need to control the microstructure of the material to have large number of bridging grains, to increase the aspect ratio of the grains, or to introduce residual stresses with a grain boundary strength being sufficiently decreased.

The above-mentioned directions of microstrucutre control for improving fracture toughness in long-crack regions, however, are reported to suffer from the drawbacks of strength reduction due to large grain size and short-crack toughness decrease due to weakened grain boundary strength (N. P. Padture, C. J. Evans, H. H. K. Xu and B. R. Lawn, Enhanced Machinability of Silicon Carbide via Microstructural Design, J. Am. Ceram. Soc., 78[1] 215–17 (1995)). These drawbacks also give rise to fatal problems, including decreases in wear resistance and fatigue properties, in association with short cracks.

To meet all of the physical properties for structural parts, such as strength, toughness, wear resistance, fatigue properties, etc., materials which are individually superior in one of the properties are often made to be composite. Conventional composites have microstructures with each constituents being homogeneously distributed. Thus, the physical properties of a composite have a tendency to change in proportion to the relative amounts of constituent materials. Such a composite material, however, cannot satisfy both long-crack properties such as toughness and short-crack properties such as wear resistance and fatigue properties, simultaneously.

Therefore, there remains a need for an improved composite material that is suitable for use in structural parts, which require excellent and balanced physical properties.

SUMMARY OF THE INVENTION

Leading to the present invention, the extensive and intensive research on a composite material, repeated by the present inventors aiming to solve the problems encountered in prior arts, resulted in the finding that, when being formed into a layer structure in which materials with desired physical properties are properly distributed on and inside the surface or being provided with a modified surface or a coating layer of high short-crack toughness, a material with high long-crack toughness could show appropriate strength, toughness, wear resistance and fatigue properties which meet the conditions for specialized uses. When designing the layer structure, account must be taken of the interlayer stress, elastic/plastic mismatches, the layer thickness, and the grain boundary strength between layers. Unless these conditions are optimized, the resulting composite material may be rather weakened.

Therefore, it is an object of the present invention to provide alumina-based ceramics with a modified surface which has little difference in the interlayer stress and elastic/plastic mismatches.

It is another object of the present invention to provide a method for manufacturing a surface-modified alumina-based ceramics, which is simple and can be easily applied to conventional manufacturing method of alumina-based ceramics.

In accordance with the present invention, there is provided a method for manufacturing a surface-modified alumina-based ceramics, comprising the steps of: sintering an iron oxide-containing alumina powder compacts in an atmosphere of a relatively low oxygen partial pressure; and annealing the sintered body in an atmosphere higher in oxygen partial pressure than the sintering atmosphere, whereby the alumina-based ceramics has a grain-boundary migration layer on its surface.

In another aspect of the present invention, there is provided monolithic or composite ceramics, which is surface modified by chemically induced grain boundary migration.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention may be understood more readily by reference to the following detailed description of preferred embodiments of the.invention and the figures.

Figure 1:
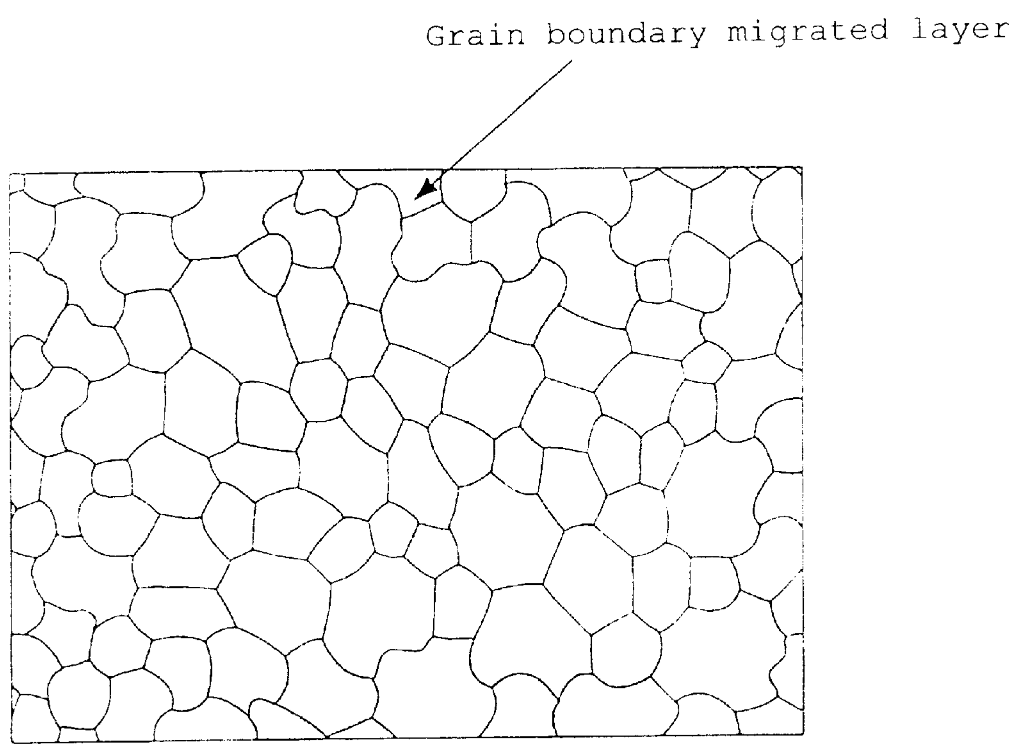
FIG. 1 is a schematic view illustrating a grain-boundary migrated surface layer and internal microstructure resulting from the heat treatment in different atmospheres in accordance with the present invention.

With reference to FIG. 1, there is alumina-based ceramics whose surface is modified by chemically induced grain-boundary migration (CIGM). Unlike the inside of the sample in which the grain boundaries are smoothly curved as in general solid-phase sintered bodies, the modified layer formed on the surface has curved and undulated grain boundaries. It is believed that the curved and undulated grain boundaries deflect crack propagation paths, imparting a greater resistance to crack propagation. According to previous results (B. R. Lawn, Fracture of Brittle Solids, Cambridge University Press, Cambridge, U.K., 1993), the fracture toughness increase by crack deflection is smaller than that by bridging or pull-out. During the growth of flaws on the material surface or in the early stage of crack propagation, however, crack deflection is believed to play a more important role in increasing fracture toughness than does bridging or pull-out. Therefore, wear and fatigue properties, which are more affected by short-crack toughness than by long-crack toughness, can be improved by the surface modification via the grain-boundary migration.

In a chemically unstable state, for example, when solute atoms dissolve into a material or when solute atoms come out from a solid solution, the CIGM occurs as the solute atoms diffuse along the grain boundaries, which serve as rapid migration routes, to reach a new equilibrium state. In contrast to typical grain growth, this phenomenon results in an increase in grain boundary area with the same crystallographic orientations between the original grain and the migrated region. A new solid solution which has a discontinuity in chemical composition forms behind the fast-moving grain boundaries.

$Cr_2O_3$ and $Fe_2O_3$ have been used as solute elements for studies on the grain-boundary migration in alumina. When an alumina sintered body is annealed along with $Cr_2O_3$ or $Fe_2O_3$ powder to supply the solute element via a gas phase or when a solid solution is annealed to allow the solute elements to come outs the grain-boundary migration is observed. Particularly, when $Fe_2O_3$ is used as a solute source, the solubility changes with the annealing temperatures or atmospheres, so that the second phase, such as spinel, is dissolved causing grain-boundary migration.

The driving force for the grain-boundary migration is dependent on the concentration of the solute added. Most studies concerning grain boundary migrations in $Al_2O_3$ were limited to systems with relatively high concentrations of solutes. However, the mechanical properties of alumina deteriorate with an increasing amount of $Fe_2O_3$ solute. Particularly, the addition of a large amount of $Fe_2O_3$ causes a second phase precipitation and makes it difficult to control the growth of grains. It is, therefore, important to use $Fe_2O_3$ at an amount as small as possible to induce grain-boundary migration.

Figure 2A:
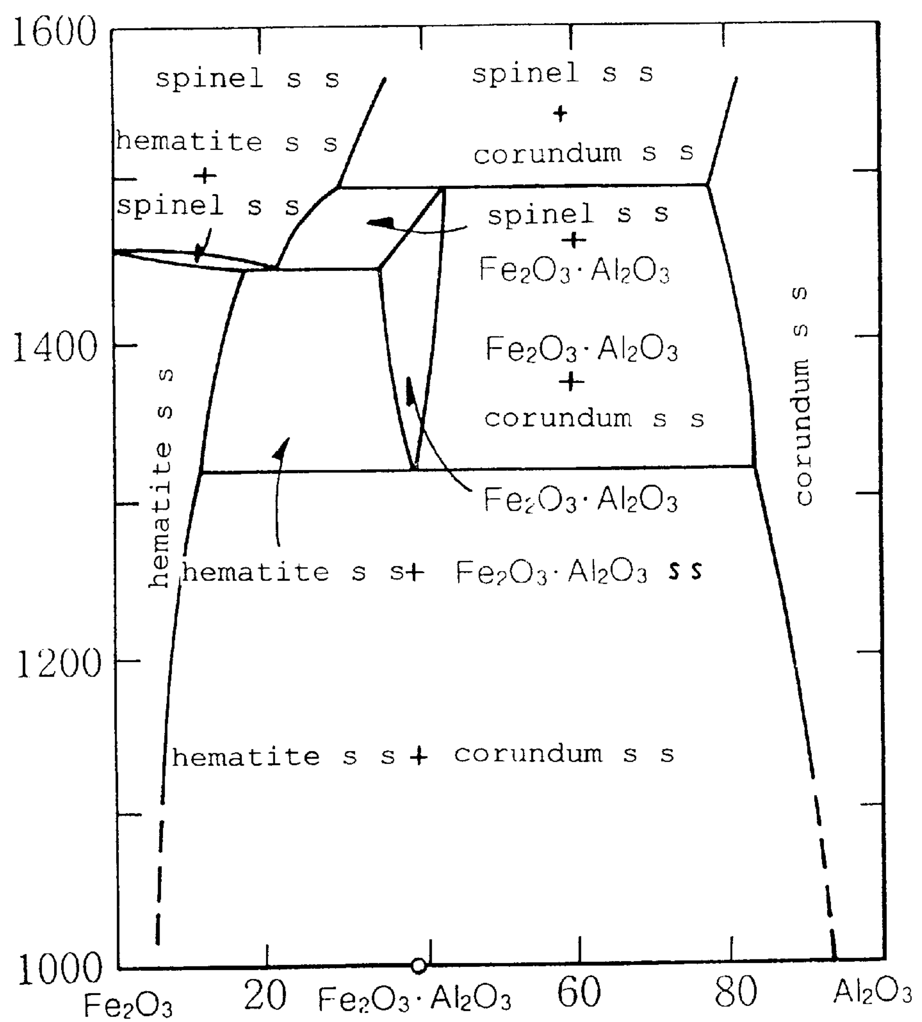
FIG. 2 shows $Al_2O_3$—$Fe_2O_3$ phase diagrams under oxygen partial pressures of 1 atm (a) and less than 0.03 atm (b)
Figure 2B:
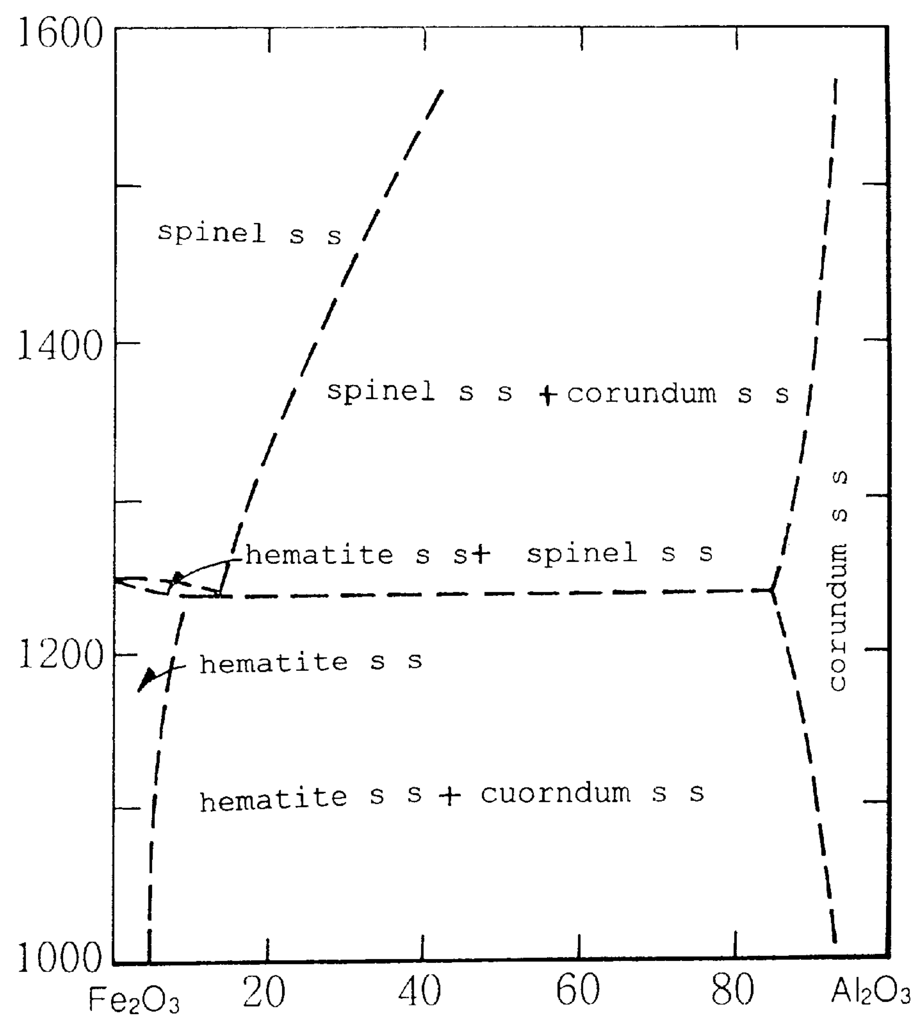

In the previous investigations by the present inventors, it was demonstrated that a large driving force for grain-boundary migration was generated upon addition of an additive in a gas phase or liquid phase, or upon a change in the annealing condition such as a temperature change. (H.-Y. Lee and S.-J. L. Kang, "Chemically Induced Grain Boundary Migration and Recrystallization in $Al_2O_3$," Acta Mater., 38 1307–12 (1990); H. Y. Lee, Y. K. Paek, B. K. Lee and S.-J. L. Kang, "Discontinuous Dissolution of Iron Aluminate Spinel in the $Al_2O_3$—$Fe_2O_3$ System," *J. Am. Ceram. Soc.*, 78[8]2149–52 (1995)) As shown in the phase diagrams in FIG. 2, $Fe_2O_3$ undergoes a very large change in solubility according to the temperature and the oxygen partial pressure of the annealing atmosphere. According to the phase diagrams in FIG. 2, the solubility of $Fe_2O_3$ in $Al_2O_3$ is about 20 wt % at 1,500° C. under an oxygen partial atmosphere of 1 atm. (FIG. 2*a*), but the solubility decreases with a decreasing the oxygen partial pressure and finally is reduced to about 3 wt % at an oxygen partial pressure of 0.03 atm (FIG. 2*b*). In our experiment, the solubility of $Fe_2O_3$ was measured to be as low as 0.02 wt % in a $95N_2$-$5H_2$ atmosphere which had a oxygen partial pressure lower than 0.03 atm. This measurement suggests that the solubility of $Fe_2O_3$ is further reduced in an $H_2$ atmosphere which had a oxygen partial pressure of about $10^{-14}$ atm.

Therefore, it would be possible to make a layer with a grain-boundary migration at the surface, as schematically shown in FIG. 1 by addition of a small amount of $Fe_2O_3$ and controlling the oxygen partial pressure of the annealing atmosphere. In detail, an $Al_2O_3$ powder compact with uniform distribution of a very small amount of $Fe_2O_3$ is sintered in an atmosphere of a relatively low oxygen partial pressure ($N_2$, $95N_2$-$5H_2$, $H_2$, etc) so as to allow excess Fe to be present at grain boundaries, and then heat-treated in an atmosphere of a higher oxygen partial pressure ($80N_2$-$20O_2$, $O_2$, etc) to induce the dissolution of Fe present at the grain boundaries into grains and, at the same time, the grain-boundary migration.

In other words, the formation of a grain-boundary migration layer is possible under the condition in which Fe exists as a second phase at grain boundaries upon sintering, and then dissolves into grains to form a solid solution during a heat treatment. As can be seen in the phase diagrams in FIG. 2, the solubility of $Fe_2O_3$ in $Al_2O_3$, although it changes with the sintering temperatures, does not exceed 0.01 wt % at low oxygen partial pressures, for example, in a $H_2$ atmosphere, while the solubility remains in the level of about 20 wt % or less at high oxygen partial pressures, for example, in an oxygen atmosphere. Thus, for the concentration of $Fe_2O_3$ between 0.01 and 20 wt %, a grain-boundary migration layer can be made by controlling the temperature and atmosphere of the sintering and annealing. Consequently, $Fe_2O_3$ can be used in the range of 0.01 to 20 wt % in accordance with the present invention. In Examples, which will be described later in detail, the amount of $Fe_2O_3$ was settled to be 0.156 wt % (1,000 ppm Fe/Al) and 1 wt % only to demonstrate the characteristics of the present invention, but it should be understood that the scope of the present invention is not limited to these amounts, but extended to the range of 0.01 to 20 wt %.

The chemically induced grain-boundary migration occurs at lower temperatures than those where alloying occurs by volume diffusion. In addition, the alloying by CIGM is much faster than that by volume diffusion. Depending on annealing atmospheres, the thermal etching of alumina-based materials is carried out at 1,000–1,600° C. for several minutes to several hours. In general, since the grain-boundary migration occurs at thermal etching temperatures, the heat-treatment for CIGM may be done at 1,000–1,600° C. Accordingly, the annealing temperature of 1,500° C., which was adopted in the following Examples, is only to accentuate the characteristics of the present invention, but is not intended to limit the scope of the present invention. Therefore, any temperature within the range of 1,000 to 1,600° C. allows the heat treatment to be desirably conducted.

In the following examples, the concept of the present invention was materialized as surface layers on single phase alumina. However, since $Fe_2O_3$ induces the grain-boundary migration in alumina materials, the concept of the present invention can also be applied to alumina-based composite materials. Therefore, not only alumina, but also alumina-based composite materials are within the scope of the present invention.

The following examples are given on the basis of the features shown in the $Al_2O_3$—$Fe_2O_3$ phase diagrams in FIG. 2. The basic idea of the present invention relies on the formation of curved and undulated grain boundaries, as shown in FIG. 1, which can improve the short-crack toughness.

The principle of the present invention can also be applied to the formation of surface layers by use of other additives which can cause chemically induced grain-boundary migration. For the $Al_2O_3$—$Cr_2O_3$ system, $Al_2O_3$ and $Cr_2O_3$ form a complete solid solution. When an appropriate amount of $Cr_2O_3$ is added via a gas phase or when the annealing temperature is changed, grain-boundary migration can occur to give a grain-boundary migration layer with curved and undulated grain boundaries. The grain-boundary migration layer thus formed can also bring about an improvement in short-crack toughness.

A better understanding of the present invention may be obtained in light of the following examples which are set forth to illustrate, but are not to be construed to limit the present invention.

EXAMPLE I

Samples of 1000 ppm Fe-doped $Al_2O_3$ were prepared from $Al_2O_3$ and $Fe(NO_3)_2.9H_2O$ powders. The proportioned powder mixture was wet-milled for 12 h in ethyl alcohol using a polyethylene bottle and high purity alumina balls. The dried slurry was isostatically pressed under 200 MPa into bars of ~5×5×21 mm in size. After being calcined at 800° C. for two hours in $95N_2$-$5H_2$, the compact samples were sintered at 1,500° C. for three hours in a $95N_2$-$5H_2$ atmosphere. The sintered samples, which were polished to a 3 $\mu$m finish, were annealed at 1,500° C. for 1.5 hours in air to form a grain-boundary migration layer on the surface thereof. During the heat treatment, the total gas flow was maintained at 200 sccm in all atmospheres.

COMPARATIVE EXAMPLE I

The same procedure as in Example I was repeated except that the heat treatment was carried out in the sintering atmosphere ($95N_2$-$5H_2$)

Figure 3A:
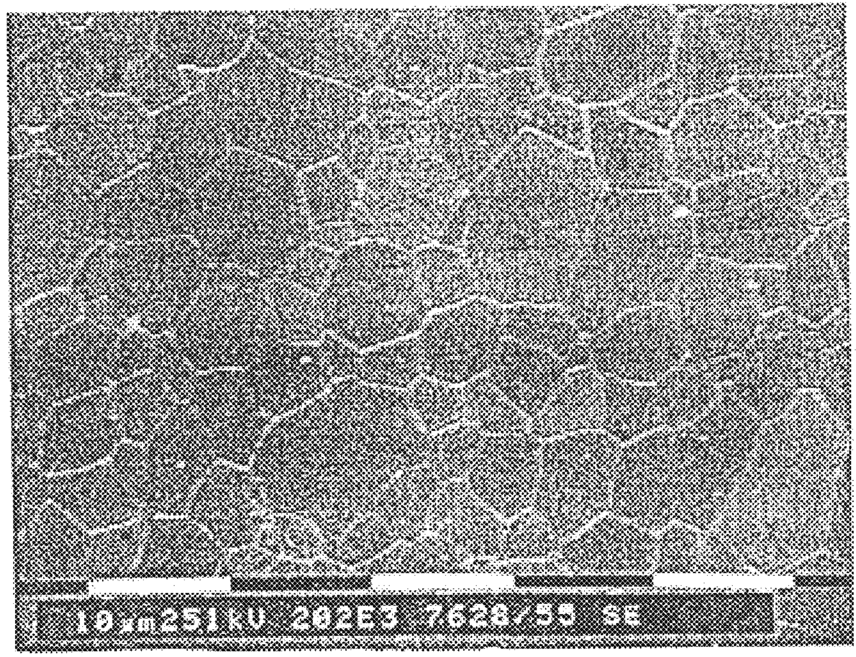
FIG. 3 is the SEM images of the 1000 ppm Fe doped $Al_2O_3$ samples showing the surface microstructures of a typical alumina-based ceramics which do not undergo grain boundary migration (a) and an alumina-based ceramics whose surface is modified by grain boundary migration in accordance with the present invention (b)
Figure 3B:
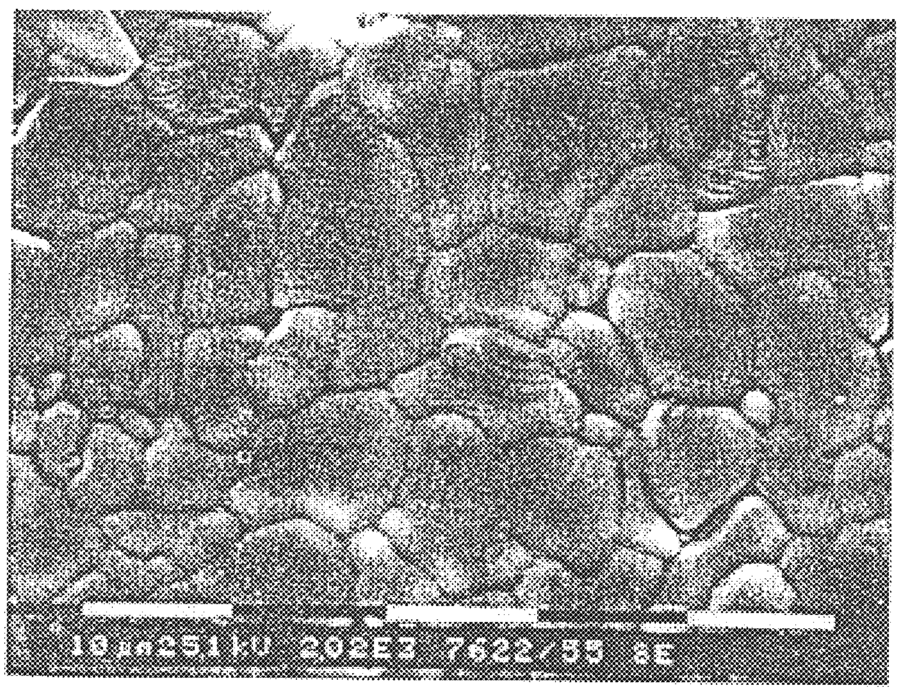

With reference to FIG. 3, the surface microstructures of the samples obtained in Example I (b) and Comparative Example I (a) were observed under a scanning electron microscope. As seen in FIG. 3*a*, the sample which was annealed in the sintering atmosphere ($95N_2$-$5H_2$) had a typically polycrystalline microstructure. In the case of the sample which was annealed in the higher oxygen partial pressure atmosphere (air, $80N_2$-$20O_2$) than the sintering atmosphere, a grain-boundary migration layer was formed on the surface. In the migration layer, a new solid solution layer was present between grain boundaries and the shape of the grain boundaries was curved and undulated rather than smoothly curved. Such an undulated grain boundary structure is believed to deflect crack propagation paths to impart resistance to the crack propagation.

TEST EXAMPLE I

Hertzian Indentation Test

The samples prepared by the same method as in Example I were finely polished by use of 1 $\mu$m diamond paste to remove the thermal grooves formed during the heat treatment and then, subjected to a Hertzian indentation test using a 3.18 mm WC ball under a load of 500–2,000 N. The crosshead speed was 0.2 mm/min. Indentation damages and cone cracks were observed under an optical microscope. The critical load for cone crack initiation was measured to be 900 N for the samples with grain-boundary migration layers and 700 N for the samples with no grain-boundary migration layers. In other words, the introduction of a grain-boundary migration layer on the surface improved the critical load by 200 N.

TEST EXAMPLE II

Vickers Indentation Test

The same samples as were prepared for the Hertzian Test were subjected to a Vickers indentation test with a load of 2 kg. After the test, the crack length was measured and the toughness was estimated using the equation proposed by Lawn et al. (G. R. Anstis, P. Chantikul, D. B. Marshall and B. R. Lawn, "A Critical Evaluation of Indentation Techniques for Measuring Fracture Toughness: I. Direct Crack Measurements," J. Am. Ceram. Soc., 64[9] 53–58 (1981)) The toughness of the sample which had a grain-boundary migration layer was measured to be 3.43 $MPa.m^{1/2}$, which was greater by about 10% than the toughness (3.12 $MPa.m^{1/2}$) of the sample which had no grain-boundary migration layer thereon.

TEST EXAMPLE III

Measurement of Strength

Some samples which were prepared following the sample preparation described in Example I were machined to a dimension of 3×4×16 mm for strength measurement. The face subjected to a tensile stress was finely polished to 1 $\mu$m finish and the edges of the samples were chamfered at an angle of 45°. In a jig with an inner span of ¼" and an outer span of ½", the four-point bending strength was measured with a crosshead speed of 20 mm/min. The bending strength was measured as an average of the measurements from eight samples. For the samples which had a grain-boundary migration layer on their surface, the four-point bending strength was determined to be 434±33 MPa, which was similar to the four-point bending strength (449±47 MPa) of the samples without a grain-boundary migration layer.

Figure 4:
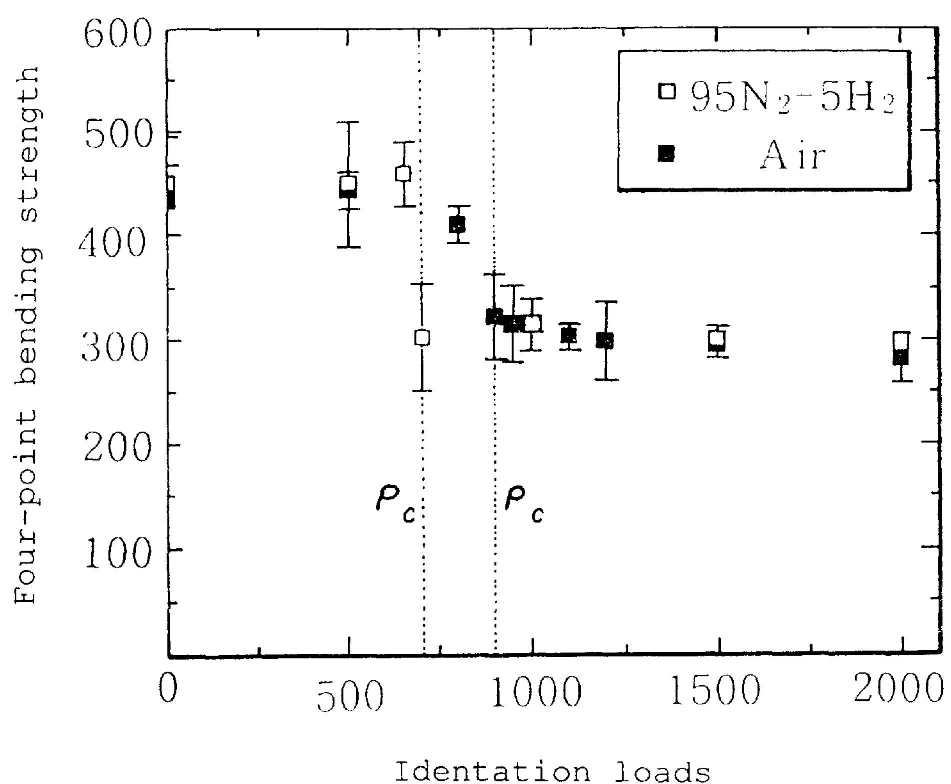
FIG. 4 is a graph showing the strengths of a surface-modified modified alumina samples (■) and a typical alumina samples (¤) with respect to Hertzian indentation loads, in which the $P_c$ stands for a critical load at which a cone crack is created.

Strength degradation experiment was also performed. A Hertzian indentation was made on the surface of the samples for four-point bending strength measurement under a load of 500–2,000 N. After the indentation, four point bending strength, was measured with a crosshead speed of 20 mm/min. Three samples were used for each load. The broken sites of the samples were observed using an optical microscope. The strength degradation results are given in FIG. 4. As can be seen in FIG. 4, the strength degradation occurs at the indentation load of 900 N for the sample with a grain-boundary migration layer while the degradation occurs at 700 N for the sample without a migration layer.

EXAMPLE II

Samples of $99Al_2O_3$-$1Fe_2O_3$ (wt % ) were prepared from $Al_2O_3$ and $Fe(NO_3)_2.9H_2O$ powders. The proportioned powder mixture was wet-milled for 12 h in ethyl alcohol using a polyethylene bottle and high purity alumina balls. The dried slurry was isostatically pressed under 200 MPa into bars of ~5×5×21 mm in size. After being calcined at 800° C. for two hours in $95N_2$-$5H_2$, the compact samples were sintered at 1,600° C. for two hours in a $95N_2$-$5H_2$ atmosphere. The sintered samples, which were polished to a 3 μm finish, were annealed at 1,500° C. for 2 hours in air to form a grain-boundary migration layer on the surface thereof. During the heat treatment, the total gas flow was maintained at 200 sccm in all atmospheres.

COMPARATIVE EXAMPLE II

The same procedure as in Example II was repeated except that the heat treatment was carried out in the sintering atmosphere ($95N_2$-$5H_2$)

Figure 5A:
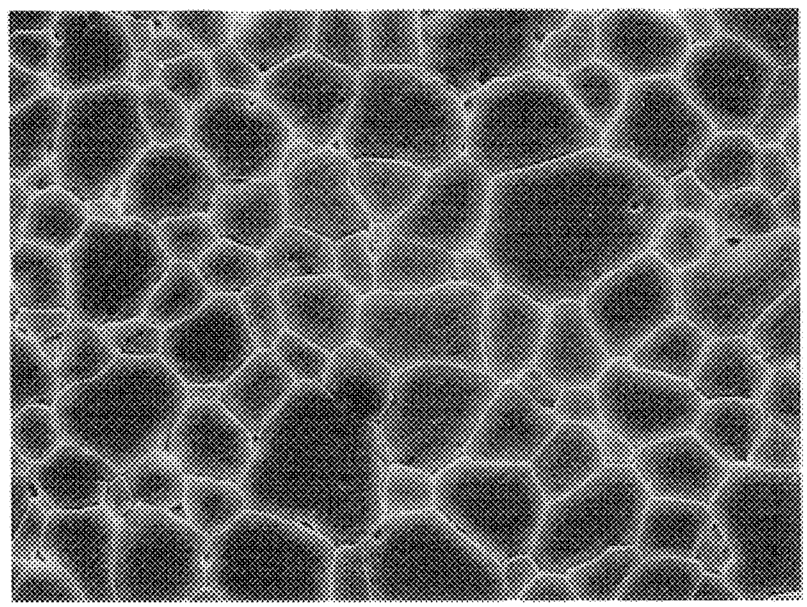
FIG. 5 is the SEM images of the $99Al_2O_3$-$1Fe_2O_3$ (wt %) samples showing the surface microstructures of a typical alumina-based ceramics which do not undergo grain boundary migration (a) and an alumina-based ceramics whose'surface is modified by grain boundary migration in accordance with the present invention (b)
Figure 5B:
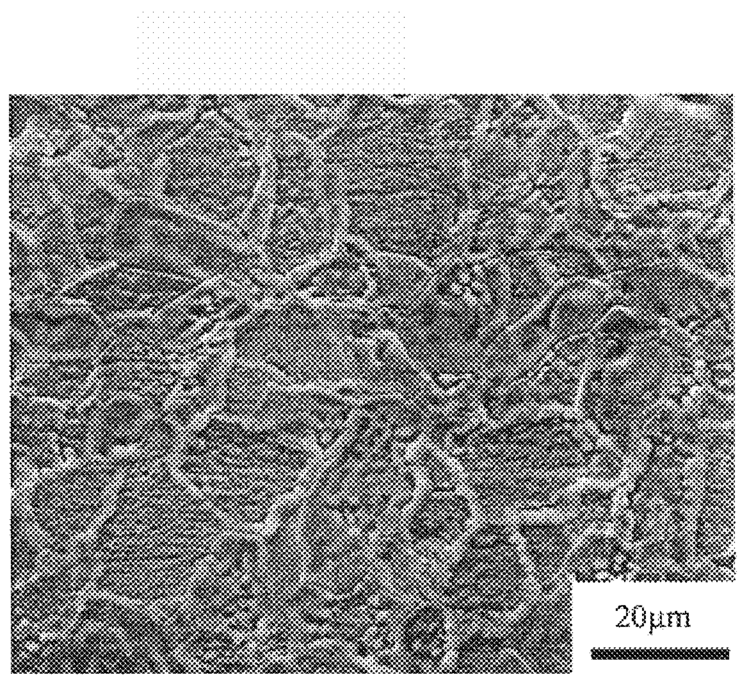

With reference to FIG. 5, the surface microstructures of the samples obtained in Example II (b) and Comparative Example II (a) are observed using a scanning electron microscope. As shown in FIG. 5*a*, the sample which was annealed in the sintering atmosphere ($95N_2$-$5H_2$) has a typically polycrystalline microstructure. In the case of the sample which was annealed in the higher oxygen partial pressure atmosphere ($80N_2$-$20O_2$) than the sintering atmosphere, a grain-boundary migration layer formed on the surface of the sample. A new solid solution layer is observed between grain boundaries and the grain boundary exhibits a undulated structure (FIG. 5*b*) rather than a smoothly curved one (FIG. 5*a*). Such an undulated grain boundary structure is believed to deflect crack propagation paths to impart resistance to the crack propagation.

TEST EXAMPLE IV

Figure 6A:
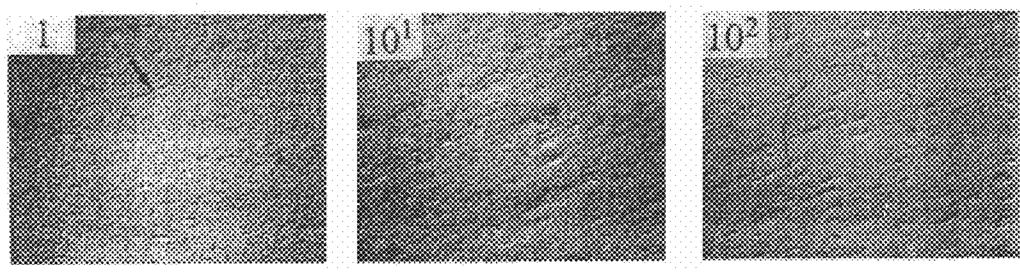
FIG. 6 shows the surface damages formed during increase in contact cycles with the Hertzian indentation load of 1000 N in the samples wintered at 1600° C. for 2 h in $95N_2$-$5H_2$ and then annealed at 1500° C. for 2 h in $95N_2$-$5H_2$ (a) and in air (b). The figures on the micrographs denote the numbers of contact cycles.
Figure 6B:
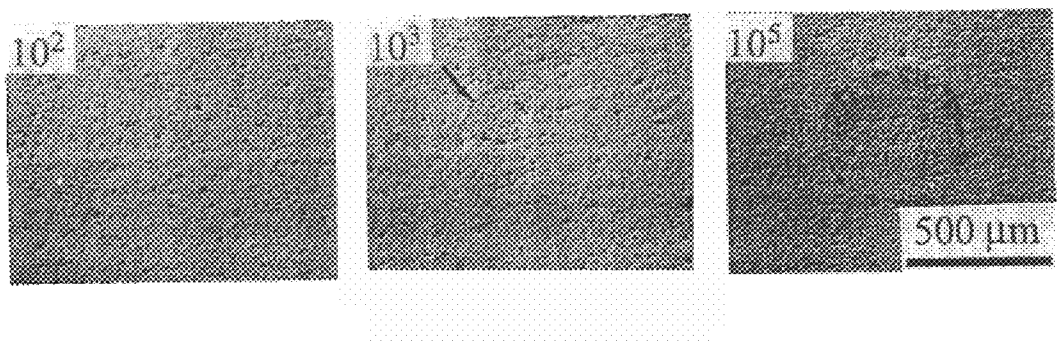

The samples prepared in the same method as in Example II were finely polished by use of 1 μm diamond paste to remove the thermal grooves formed during the heat treatment and then, subjected to a Hertzian cyclic indentation test using a 3.18 mm WC ball. The cyclic tests were run in repeat loading in haversinusoidal waveform up to $10^5$ cycles at frequency f=10 Hz, between the specified maximum (1000 N) and minimum loads (the latter typically 20 N, primarily to prevent the contact from wandering). The indented surfaces were examined by optical microscopy. FIG. 6 shows the surface damage evolution during the cyclic indentation tests under a 1000 N load of the two different samples with and without a grain-boundary migration layer. A surface ring crack forms at the first cyclic loading and the damage becomes severe with increasing contact cycles in the $95N_2$-$5H_2$-annealed sample without a grain-boundary migration. On the other hand, for the air-annealed sample with a migration layer, a surface ring crack does not develop until $10^2$ cycles but is observed after $10^3$ cycles.

According to the present invention, the surface microstructure of alumina-based ceramics can be easily modified to have undulated grain-boundary structures by changing the atmospheres during sintering and annealing. The surface layer thus formed can improve short-crack toughness by suppressing and deflecting the crack propagation. In summary, the formation of a grain-boundary migration layer on the surface of ceramics, which can be simply achieved according to the present invention, brings about a great improvement in short-crack related properties, including durability and wear resistance. Further, the present invention enjoys the advantage of being able to apply the relatively simple heat treatment process to conventional manufacturing methods of alumina-based ceramics.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a surface-modified alumina-based ceramic, comprising the steps of:

sintering a powder compact of an iron-containing alumina powder in an atmosphere of a relatively low oxygen partial pressure; and annealing the sintered body in an atmosphere higher in oxygen partial pressure than the sintering atmosphere, whereby the alumina-based ceramic has a grain-boundary migration layer on a surface thereof.

2. The method as set forth in claim 1, wherein the iron is used in a form of $Fe_2O_3$ at an amount of 0.01–20 wt % based on the weight of the alumina powder.

3. The method as set forth in claim 1, wherein the annealing step is conducted at 1,000–1,600° C. for several minutes to several hours.

* * * * *